Figure 1:
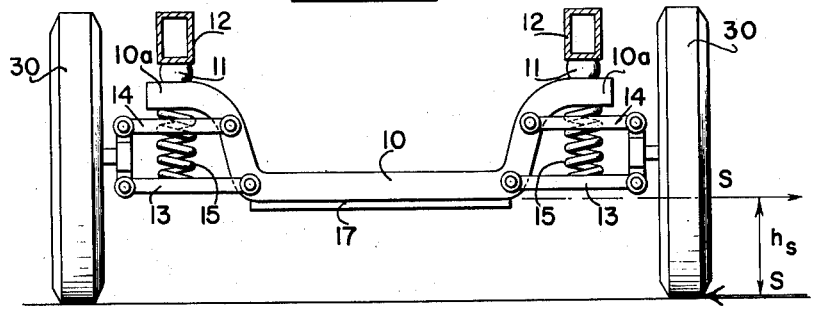

April 30, 1963  J. MÜLLER ETAL  3,087,742
SUPPORT MEANS FOR AN INDEPENDENT WHEEL SUSPENSION
Filed June 22, 1959

INVENTORS
JOSEF MÜLLER
KARL WILFERT
ERNST J. H. FIALA

BY *Dike, Craig and Freudenberg*

ATTORNEYS

United States Patent Office 3,087,742
Patented Apr. 30, 1963

3,087,742
SUPPORT MEANS FOR AN INDEPENDENT WHEEL SUSPENSION
Josef Müller, Stuttgart-Riedenberg, Karl Wilfert, Stuttgart-Degerloch, and Ernst J. H. Fiala, Sindelfingen, Kreis Boblingen, Germany, assignors to Daimler-Benz Aktiengesellschaft, Stuttgart-Unterturkheim, Germany
Filed June 22, 1959, Ser. No. 821,741
Claims priority, application Germany June 21, 1958
2 Claims. (Cl. 280—106.5)

The present invention relates to the suspension of an axle cross bearer member for individual wheel suspensions, preferably of a front cross bearer member of a motor vehicle which is elastically supported at the vehicle superstructure such as the vehicle frame or vehicle body of a self-supporting body, approximately in the vertical transverse plane extending through the centers of the wheels.

The present invention proposes to provide a further support for the axle bearer member in a second transverse plane at a distance either in front or to the rear of the first transverse plane which further support permits swinging movements only about an essentially horizontal transverse axis while preventing other swinging movements or displacements, especially lateral displacements of the axle bearer member in the axle transverse direction.

It is achieved by the use of an arrangement and construction in accordance with the present invention that the cross bearer member is guided accurately. Consequently, the elastic support of the cross bearer member at the vehicle superstructure such as the vehicle frame or vehicle body may be made of any desired softness without having to fear that the connection of the cross bearer member with the vehicle would also become thereby excessively resilient or yielding in the transverse or vehicle longitudinal direction as regards an unobjectionable driving behavior and driving characteristic. Furthermore, the swinging support in accordance with the present invention also serves for the purpose of absorbing the lateral forces which act on the wheels and for absorbing the braking moments.

It is particularly advantageous in accordance with the present invention if the elastic bearing support and the swinging support are disposed at different heights, especially if the elastic bearing support is disposed approximately at the height of the upper part of the wheel and the swinging support below the wheel center because the lateral forces are then transmitted to the vehicle superstructure such as vehicle frame or vehicle body relatively low and, therefore, exert only a relatively small moment which seeks to rotate the cross bearer member about a longitudinal axis and because, in that case, a relatively large lever arm is available for purposes of bracing or absorbing the braking moments produced by a force acting on the swinging support in an essentially horizontal direction so that the force does not become excessively large.

Furthermore, the present invention may be so arranged and constructed in detail that a sheet metal member, preferably reinforced by embossments or the like is rigidly connected with the center part of the axle bearer member which, in particular, is bent upwardly laterally thereof and carries thereat the elements for the elastic support whereby the sheet metal member extends essentially in the horizontal direction and carries at the end thereof the elements of the swinging support thereof. The sheet metal member may thereby be constructed simultaneously as a sheet metal closure member forming a cover against the road surface, for example, for the protection of the crank case against stones or gravel thrown up thereagainst from the road surface.

However, the arrangement according to the present invention may also be so made that an essentially horizontally extending arm is rigidly connected with the axle bearer member on each side thereof whereby each arm carries at the end thereof the element for the swinging support.

According to another feature in accordance with the present invention, two horizontally extending struts extend from the center of the axle bearer member outwardly at an incline, the outer ends of which are pivotally secured at the vehicle superstructure such as the frame or the vehicle body.

Accordingly, it is an object of the present invention to provide a support for an axle cross bearer member of the wheel suspension at the vehicle superstructure which is relatively soft and which absorbs the forces occuring at the wheels in a particularly advantageous manner.

Another object of the present invention resides in the provision and arrangement of a transverse axle bearer member from which the individual wheels are individually suspended in combination with the elastic support of the axle bearer member at the main frame or vehicle body in such a manner as to permit a soft support thereof while at the same time effectively absorbing the lateral forces acting on the wheels as well as the braking moments caused by deceleration of the vehicle.

Still another object of the present invention is the provision of an axle bearer member extending transversely of the vehicle which is so supported at the vehicle as to provide favorable conditions for the transmission of forces which may occur at the wheels.

Figure 2:
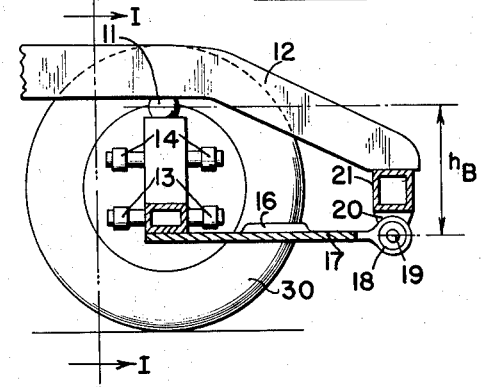
Figure 4:
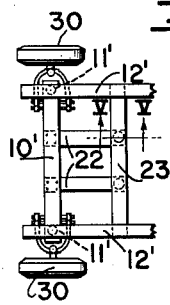
Figure 5:
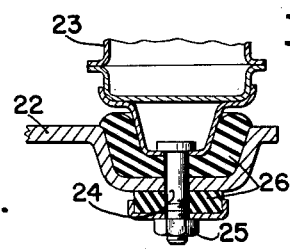
Figure 3:
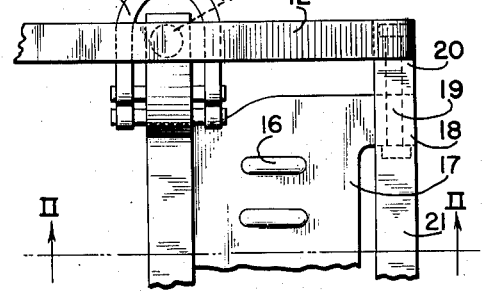
Figure 6:
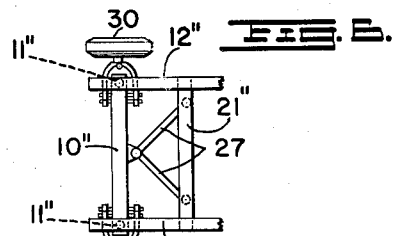

These and other objects, features, and advantages of the present invention will become more obvious from the following description when taken in connection with the accompanying drawing which shows, for purposes of illustration only, several embodiments in accordance with the present invention, and wherein:

FIGURE 1 is an elevational cross sectional view, taken along line I—I of FIGURE 2, of a suspension in accordance with the present invention taken from the rear thereof, FIGURE 2 is a longitudinal cross sectional view of the wheel suspension in accordance with the present invention taken along line II—II of FIGURE 3, FIGURE 3 is a partial top plan view of the wheel suspension of FIGURES 1 and 2 in accordance with the present invention, FIGURE 4 is a top plan view, on a smaller scale, of a modified embodiment of a wheel suspension in accordance with the present invention, FIGURE 5 is an enlarged cross sectional view taken along line V—V of FIGURE 4, and FIGURE 6 is a top plan view, similar to FIGURE 4, of still another embodiment of a wheel suspension in accordance with the present invention.

Referring now to the drawing wherein like reference numerals are used throughout the various views to designate like parts, and more particularly, to FIGURES 1, 2 and 3 thereof, reference numeral 10 designates the transversely extending axle bearer member which is provided along the sides thereof with upwardly bent end portions 10a. The cross bearer member 10 is elastically supported over relatively soft rubber elements 11 at the longitudinal frame members 12 along the upwardly bent end portions 10a thereof. The individual wheels 30 are piovtally suspended from the cross bearer member 10 by means of double transverse guide members 13 and 14. Coil springs 15 operatively connected between the lower transverse guide member 13 and a respective upwardly bent end portion 10a thereby take over the function of spring support.

A sheet metal member 17 reinforced by corrugations or embossments 16 is secured at the center part of the cross bearer member 10. The sheet metal member 17 is provided at the free end thereof with two lug portions 18 for accommodating therein the bearing pins 19. The sheet metal member 17 is pivotally secured by means of bearing pins 19 within the bearing lugs 20. The bearing lugs 20 are arranged at the frame cross bearer member 21. By reason of this type of pivotal or swinging support arrangement of the cross bearer member 10, the latter is unequivocally guided at the vehicle superstructure such as the frame thereof so that, notwithstanding the rubber elements 11 which may be of any desired softness, no undesired transverse displacements or longitudinal displacements of the axle bearer member 10 and therewith of the wheels 30 may take place relative to the frame 12.

As is also clearly visible from FIGURE 1, a lateral force S acting on the wheels is effective on the axle bearer member 10 only with a relatively small lever arm $h_S$ so that the moment $S \cdot h_S$ seeking to rotate or swing the axle bearer member 10 about a vehicle longitudinal axis remains relatively small. The lever arm for absorbing the braking moments is designated in FIGURE 2 with $h_B$. It is clearly visible from FIGURE 2 that the distance $h_B$ is relatively large and that, as a result thereof, the supporting or bracing forces which are to be transmitted by the sheet metal members 17 to the bearing pins 19 and through the rubber elements 11 to the frame 12 do not become excessively large.

The sheet metal member 17 is constructed of such length and width that it may simultaneously serve as cover member for sensitive normally exposed vehicle parts, such as the crank case, with respect to the road surface.

In the embodiment according to FIGURE 4, the sheet metal member 17 of FIGURE 1 is replaced by two arms 22 rigidly connected with the axle bearer member 10′ which are operatively connected at the free ends thereof over one rubber bearing 11′ each with the frame cross bearer member 23. The elastic connection between arms 22 and cross bearer member 23 is illustrated on an enlarged scale in FIGURE 5.

In FIGURE 5, a threaded bolt member 24 is welded to the cross bearer member 23, a nut member 25 being adapted to be threadably mounted over the lower end of bolt member 24. The free end of an arm 22 is clamped between two rubber disks 26 by means of the nut member 25. As a result of the over-all arrangement illustrated in FIGURES 4 and 5, the axle member 10′ may move only as allowed due to the resilience of the two rubber bearings. This movement will be essentially in the form of only swinging movements substantially about a transverse axis extending through the two rubber bearings or arms 22.

Another embodiment in accordance with the present invention is schematically illustrated in FIGURE 6. The axle bearer member 10″ of this embodiment is again elastically supported by means of rubber elements 11″ at the frame longitudinal bearer members 12″. Furthermore, the axle bearer member 10″ is operatively connected over supporting or thrust arms 27 with the frame cross bearer member 21″. The support of the thrust arms 27 may, as indicated schematically, be of such a construction as to provide universal movement thereof, such as, for example, a ball and socket joint or a rubber bearing of suitable equivalent construction. By the use of the arrangement illustrated in FIGURE 6, the cross bearer member 10″ is also prevented to undergo any displacements in the vehicle longitudinal direction as well as in the vehicle transverse direction. Furthermore, the thrust arms 27 also serve for purposes of transmitting the lateral forces onto the frame and for purposes of absorbing the braking moments.

While we have shown and described several embodiments in accordance with the present invention, it is understood that the same is not limited thereto but is susceptible of many changes and modifications within the spirit and scope of the present invention and we, therefore, do not wish to be limited to the details illustrated and described herein but intend to cover all such changes and modifications as are encompassed by the scope of the appended claims.

We claim:

1. A suspension system for a cross bearer axle means, especially for a front axle cross bearer member of a motor vehicle having a superstructure and at least one pair of oppositely disposed wheels, comprising transverse axle bearer means, individual spring suspension means for spring suspending said wheels from said transverse bearer means, elastic support means for elastically supporting said vehicle superstructure on said transverse bearer means, said support means being arranged in a plane extending essentially vertically transversely of the vehicle approximately through the centers of said wheels, and guiding means for guiding said transverse bearer means including a relatively rigid sheet metal member for guidingly securing said transverse bearer means to said superstructure, said member being rigidly secured to the central part of said transverse bearer means over a major portion of the length thereof, and means pivotally connecting said member to said vehicle superstructure for pivoting about an axis extending essentially horizontally and transversely of the vehicle in an essentially vertical plane displaced at a distance in the horizontal direction from said first-mentioned essentially vertical plane, said member extending essentially horizontally, said guiding means enabling swinging movements of said transverse bearer means essentially about only said pivot axis and essentially preventing other swinging movements and displacements of the transverse bearer means in the transverse direction of the vehicle, said pivot axis and said elastic support means being arranged at different heights.

2. A suspension according to claim 1, wherein said means pivotally securing said member to said superstructure includes lug members secured to the opposite corners of said sheet metal member, bearing lugs secured to said superstructure and bearing pins pivotally securing said lug members and said bearing lugs to each other.

References Cited in the file of this patent

UNITED STATES PATENTS

| | | |
|---|---|---|
| 2,176,978 | Northrup | Oct. 24, 1939 |
| 2,480,526 | Voltz | Aug. 30, 1949 |
| 2,689,014 | Nallinger | Sept. 14, 1954 |
| 2,751,992 | Nallinger | June 26, 1956 |
| 2,768,000 | Saives | Oct. 23, 1956 |
| 2,888,269 | Hogsten | May 26, 1959 |
| 2,929,461 | Rothweiler | Mar. 22, 1960 |